(12) United States Patent
Cheng et al.

(10) Patent No.: US 11,383,975 B2
(45) Date of Patent: Jul. 12, 2022

(54) COMPOSITE FOR GENERATING HYDROGEN

(71) Applicant: SiLican Inc.

(72) Inventors: Yin-Wei Cheng, Kaohsiung (TW); Chuan-Pu Liu, Tainan (TW); Jun-Han Huang, Changhua County (TW)

(73) Assignee: SiLican Inc.

( * ) Notice: Subject to any disclaimer, the term of this patent is extended or adjusted under 35 U.S.C. 154(b) by 289 days.

(21) Appl. No.: 16/882,559

(22) Filed: May 25, 2020

(65) Prior Publication Data

US 2021/0363005 A1     Nov. 25, 2021

(51) Int. Cl.
*H01M 4/02*       (2006.01)
*C01B 3/06*       (2006.01)

(52) U.S. Cl.
CPC .................................... *C01B 3/06* (2013.01)

(58) Field of Classification Search
CPC .................................................. H01M 4/02
See application file for complete search history.

(56) References Cited

U.S. PATENT DOCUMENTS

| | | | |
|---|---|---|---|
| 7,493,765 B2 | 2/2009 | Akiyama et al. | |
| 8,642,002 B2 | 2/2014 | Choi et al. | |
| 2004/0151664 A1 | 8/2004 | Auner | |
| 2005/0232837 A1 | 10/2005 | Troczynski | |
| 2008/0019903 A1 | 1/2008 | Wegner | |
| 2010/0150826 A1 | 6/2010 | Troczynski et al. | |
| 2010/0173225 A1 | 7/2010 | Rosenband et al. | |
| 2010/0209338 A1 | 8/2010 | Miki et al. | |
| 2012/0275981 A1 | 11/2012 | Foord | |
| 2017/0121830 A1* | 5/2017 | Marsh ...................... C25B 9/23 |
| 2018/0297841 A1 | 10/2018 | Garrido Escudero | |

FOREIGN PATENT DOCUMENTS

| | | |
|---|---|---|
| CN | 1178320 | 12/2004 |
| CN | 1272236 | 8/2006 |
| CN | 101175688 | 5/2008 |
| CN | 101296859 | 10/2008 |
| CN | 100475687 | 4/2009 |
| CN | 101959791 | 1/2011 |
| CN | 102137810 | 7/2011 |
| CN | 110191860 | 8/2019 |
| CN | WO2019211960 | 11/2019 |

* cited by examiner

*Primary Examiner* — Jacob B Marks
(74) *Attorney, Agent, or Firm* — Raymond Chan

(57) ABSTRACT

A composite for generating hydrogen includes several core-shell structures, each of which include a silicon-containing core and a shell covering the surface of the silicon-containing core. The shell includes a hydrophilic layer covering the surface of the silicon-containing core and an alkali material covering the hydrophilic layer.

16 Claims, 4 Drawing Sheets

COMPOSITE FOR GENERATING HYDROGEN

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present disclosure relates generally to the field of hydrogen gas production, and more particularly to a composite for generating hydrogen gas.

Description of Related Arts

In order to suppress global warming, countries around the world are paying more and more attention to the development of renewable energy technologies. In addition to solar energy, geothermal energy, wind power and tidal power, hydrogen fuel is also regarded as one type of renewable energy. The method of generating electricity based on hydrogen gas is usually by burning hydrogen gas to generate thermal energy, and then the thermal energy may be further converted into kinetic energy or electrical energy. Since water is the sole product of the combustion of hydrogen gas, carbon dioxide would not be generated during the combustion. Therefore, using hydrogen gas as a fuel to generate energy would be an effective way to stop or suppress global warming.

Generally, commercial methods for generating hydrogen gas may include two approaches: hydrogen production through refining petroleum and hydrogen production through electrolysis. However, for the hydrogen production through refining petroleum, it inevitably generates a considerable amount of carbon dioxide during the refining process; while for hydrogen production through electrolysis, a considerable amount of electrical energy has to be consumed during the electrolysis process. Therefore, the current commercial method of generating hydrogen is still quite detrimental to the environment.

Therefore, there is still a need to provide an improved composite or method for generating hydrogen gas to overcome the drawbacks in the current hydrogen gas production method.

SUMMARY OF THE PRESENT INVENTION

According to one embodiment of the present disclosure, a composite for generating hydrogen includes several core-shell structures, each of which includes a silicon-containing core and a shell covering the surface of the silicon-containing core. The shell includes a hydrophilic layer covering the surface of the silicon-containing core and an alkali material covering the hydrophilic layer.

According to one embodiment of the present disclosure, core-shell structures are in powder form.

According to one embodiment of the present disclosure, each silicon-containing core is crystalline silicon.

According to one embodiment of the present disclosure, each shell is at least a double-layered structure.

According to one embodiment of the present disclosure, each shell is at least a multi-layered structure.

According to one embodiment of the present disclosure, the compositions of the hydrophilic layers contain silicon oxide.

According to one embodiment of the present disclosure, the thickness of each hydrophilic layer is from 4 nm to 30 nm.

According to one embodiment of the present disclosure, the alkali in each shell directly contacts the hydrophilic layer.

According to one embodiment of the present disclosure, the alkali is a strong alkali.

According to one embodiment of the present disclosure, the strong alkali is selected from the group consisting of sodium hydroxide, potassium hydroxide, and lithium hydroxide.

According to one embodiment of the present disclosure, each shell further includes a salt covering the hydrophilic layer.

According to one embodiment of the present disclosure, the alkali directly contacts the salt.

According to one embodiment of the present disclosure, wherein the salt is selected from salts having solubility greater than 9.6 g/100 ml in water at 20° C.

According to one embodiment of the present disclosure, the cation of the salt is selected from the group consisting of lithium ion, sodium ion or potassium ion, and the anion of the salt is selected from the group consisting of chloride ion, carbonate ion, or sulfate ion.

According to one embodiment of the present disclosure, the alkali and the salt in each shell are homogeneously mixed with each other.

According to one embodiment of the present disclosure, one of the alkali and the salt covers the other of the alkali and the salt.

By referring to the following embodiments, those with ordinary skill in the art to which the present invention pertains can easily understand the basic spirit of the present invention and other inventive purposes, as well as the technical means and implementation aspects adopted by the present invention.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE PREFERRED EMBODIMENT

Figure 1:
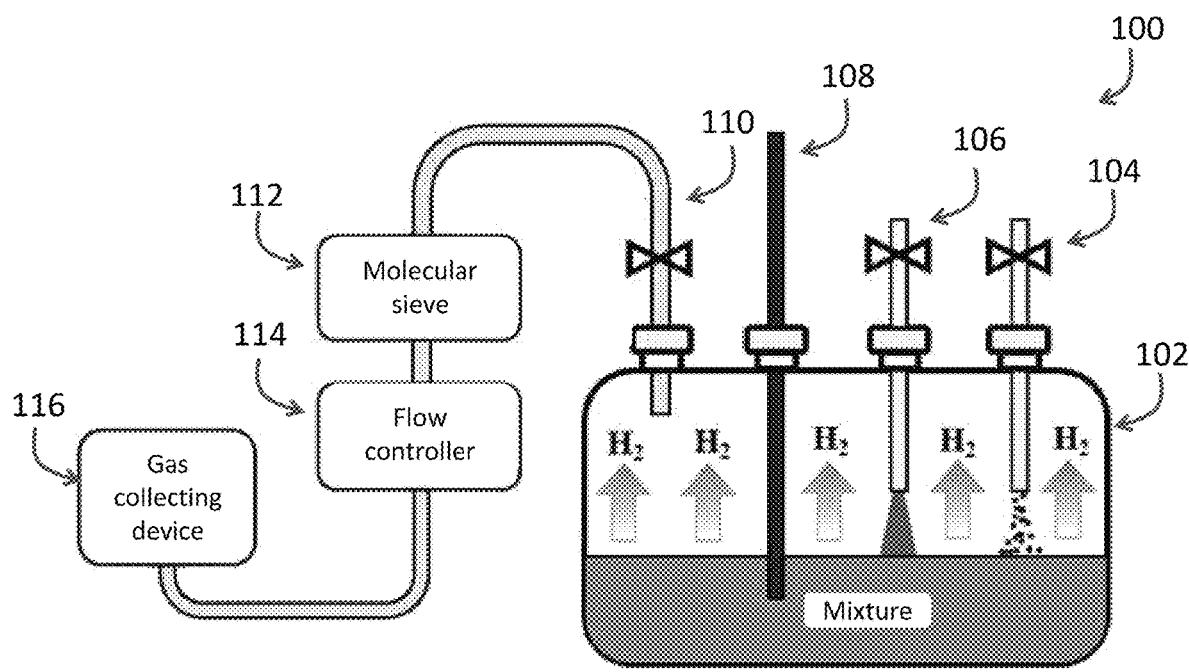
FIG. 1 is a schematic diagram showing a reaction system used to generating hydrogen gas according to one embodiment of the present disclosure.

The detailed description provided below in connection with the appended drawings is intended as a description of the embodiments and is not intended to represent the only forms in which the present embodiments may be constructed or utilized. The description sets forth the features of the embodiments as well as the steps and their sequence for operating the embodiments. However, the same or equivalent functions, steps and sequences may also be accomplished by other embodiments.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means in 10%, 5%, 1%, or 0.5% of a given value or range. Alternatively, the term "about" means in an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that may vary as desired. At the very least, each numerical parameter should at least be construed in light of the number of reported significant digits and by applying ordinary rounding techniques. Ranges may be expressed herein as from one endpoint to another endpoint or between two endpoints. All ranges disclosed herein are inclusive of the endpoints, unless specified otherwise.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

According to one embodiment of the present invention, a composite for generating hydrogen is provided. The composite may be in a powder form and composed of core-shell structures. According to one embodiment of the present disclosure, each core-shell structure is composed of a core and a shell covering (or encapsulating) the surface of the core, and the core and the shell may have different compositions. According to one embodiment of the present disclosure, the core of each core-shell structure is a silicon-containing core mainly composed of silicon, where the weight percentage of silicon in the silicon-containing core is between 80 wt % to 100 wt %, for example, 100 wt % (i.e. pure silicon). In addition, the silicon-containing core may be composed of a crystalline structure, such as a crystalline structure including polycrystalline silicon and/or single crystalline silicon. According to one embodiment of the present disclosure, the shell is a double-layered or multi-layered structure, including at least an inner hydrophilic layer and outer alkali, so that the alkali may cover or encapsulate the hydrophilic layer. The hydrophilic layer disclosed herein is referred to as a thin passivation layer which is more hydrophilic than that of the core. The composition of the hydrophilic layer may include silicon oxide ($SiO_x$), and the thickness of the hydrophilic layer is from 4 nm to 30 nm. In addition, the alkali may be a salt having the solubility higher than 12.8 g/100 ml in water (20° C.). For example, the alkali may be selected from the group consisting of weak alkalis such as ammonia ($NH_3$), ammonium hydroxide ($NH_4OH$), sodium bicarbonate ($NaHCO_3$), etc. Besides, the alkali may also be selected from the group consisting of strong alkalis such as lithium hydroxide (LiOH), sodium hydroxide (NaOH) and potassium hydroxide (KOH). According to another embodiment of the present disclosure, the shell may further include a salt covering or encapsulating the hydrophilic layer. The salt is selected from salts with the solubility greater than 9.6 g/100 ml in water (20° C.), where the cation of the salt is selected from the group consisting of lithium ion, sodium ion and potassium ion, and the anion of the salt is selected from the group consisting of chloride ion, carbonate ion, sulfate ion, etc. For example, the salt may be sodium chloride or sodium sulfate, but is not limited thereto. According to one embodiment of the present disclosure, the alkali and the salt in each shell can be homogeneously mixed with each other, so that the alkali and the salt may belong to the same sub-layer (or a sub-shell) in the shell, and both of them may cover or encapsulate the hydrophilic layer. However, according to another embodiment of the present disclosure, one of the alkali and the salt may cover the other one of the alkali and the salt, so that the alkali and the salt may respectively belong to adjacent two sub-shells in each shell, and these adjacent sub-shells may still cover or encapsulate the hydrophilic layer.

According to the above embodiments, the hydrophilic layer may be disposed between the silicon-containing core and the alkali in each core-shell structure. Since it is not easy for the hydrophilic layer to chemically react with the alkali when the composite containing the core-shell structures is in a dry powder form, the reaction between the silicon-containing core and the alkali may be prevented during the transportation of the composite. In addition, since the silicon-containing core of each core-shell structure may be covered with at least the alkali which could be dissolved in the solution quickly, the core-shell structures may be separated from each other and completely dispersed in the solution when the composite is added into a neutral or alkaline solution. Therefore, the probability that the core-shell structures aggregate in the solution would be low, thereby increasing the contact area between each silicon-containing core and the solution. In addition, since the hydrophilic layers are more hydrophilic than that of the silicon-containing cores, the polar molecules generated from dissolving the alkali in the solution may wet the hydrophilic layers immediately, and then the polar molecules may further react with the hydrophilic layers and the silicon-containing cores. As a result, the composite may generate hydrogen gas ($H_2$) quickly. Therefore, by sequentially disposing the hydrophilic layer and the alkali on the surface of each silicon-containing core, not only may the probability of aggregation of the core-shell structures be reduced, but also the composite may generate hydrogen gas more quickly. Furthermore, according to the above embodiments, by providing the additional salt, such as a salt with high solubility, in each shell, the composite may be dispersed in the solution more easily, and the probability of aggregation or agglomeration may be reduced effectively.

In order to enable a person having ordinary skill in the art to implement the present disclosure, the specific examples regarding a method of fabricating a composite for generating hydrogen gas and a method of using the composite to generate hydrogen gas are further elaborated below. It should be noted, however, that the following examples are for illustrative purposes only and should not be construed to limit the present disclosure. That is, the materials, the amounts and ratios of the materials, and the processing flow in the respective examples may be appropriately modified so long as these modifications are within the spirit and scope of the present disclosure as defined by the appended claims.

Example 1

24 g of micron-scale silicon powder (Sigma-Adrich) was obtained as the cores of the hydrogen-producing composite. Subsequently, the silicon power was annealed in a vacuum environment in order to oxidize the surface of the silicon powder and thereby form a layer of silicon oxide on the surface of the silicon powder. Thus, silicon (Si)/silicon oxide ($SiO_x$) power where silicon oxide (i.e. shell) covers silicon (i.e. core) was obtained, and the weight of the silicon oxide was about 8 grams (g). Afterwards, the silicon/silicon oxide power was added to a solution containing NaCl and KOH. The mixed solution was then agitated until the silicon/silicon oxide power was homogeneously dispersed in the solution. Before long, the mixed solution was dried up, thereby producing silicon/silicon oxide powder coated with an outer shell made of NaCl and KOH. As an alternative, the above core-shell structures containing the silicon cores and the shells may also be produced by homogeneously mixing the silicon/silicon oxide powder with the NaCl and KOH powder until the surface of the silicon/silicon oxide powder was coated with the NaCl and KOH powder. The total weight of the NaCl and KOH powders was 16 g, and the weight ratio of silicon/silicon oxide/NaCl+KOH was about 3:1:2. Besides, for the mixed powder containing silicon/silicon oxide/NaCl+KOH, the weight percent of silicon may be from 50 wt % to 90 wt %, the weight percent of silicon oxide may be from 0.1 wt % to 20 wt %, and the weight percent of NaCl (i.e. salts) and KOH (i.e. alkalis) may be from 5 wt % to 50 wt %

The above-mentioned silicon/silicon oxide/NaCl+KOH powder may be subsequently put into a reaction system to have a hydrogen-generating reaction take place and have the generated hydrogen gas collected. The structure of the reaction system is shown in FIG. 1. The a reaction system 100 includes at least a reaction chamber 102, a feed lines 104 and 106, a thermocouple 108, an gas outlet line 110, a molecular sieve 112, a flow controller 114, and a gas collecting device 116. The silicon/silicon oxide/NaCl+KOH powder may be added to the reaction chamber 102 through the feed line 104, and water or alkaline solution may be added to the reaction chamber 102 through the feed line 106. In this way, an aqueous solution containing the powder may fill at least portions of the reaction chamber 102. The reaction may take place in the reaction chamber 102 at normal temperature and pressure. Afterwards, the hydrogen generated by the reaction may sequentially flow through the gas outlet line 110, the molecular sieve 112 used to remove excess moisture, and the flow controller (M-50SLPM, Alicat) 114. Finally, the hydrogen gas may reach and then be collected by the gas collecting device 116.

Example 2

The composition and structure of the composite material in Example 2 is similar to the composition and structure of the composite material in Example 1. However, each shell of the composite material in Example 2 is made of silicon oxide (inner shell) and NaCl and NaOH (outer shell) instead of silicon oxide (inner shell) and NaCl and KOH (outer shell) as disclosed in Example 1.

Example 3

The composition and structure of the composite material in Example 3 is similar to the composition and structure of the composite material in Example 1. However, each shell of the composite material in Example 3 is made of silicon oxide (inner shell) and KCl and NaOH (outer shell) instead of silicon oxide (inner shell) and NaCl and KOH (outer shell) as disclosed in Example 1.

Example 4

The composition and structure of the composite material in Example 4 is similar to the composition and structure of the composite material in Example 1. However, each shell of the composite material in Example 4 is made of silicon oxide (inner shell) and NaCl and LiOH (outer shell) instead of silicon oxide (inner shell) and NaCl and KOH (outer shell) as disclosed in Example 1.

Example 5

The composition and structure of the composite material in Example 5 is similar to the composition and structure of the composite material in Example 1. However, each shell of the composite material in Example 5 is made of silicon oxide (inner shell) and KOH (outer shell) instead of silicon oxide (inner shell) and NaCl and KOH (outer shell) as disclosed in Example 1.

Example 6

The composition and structure of the composite material in Example 6 is similar to the composition and structure of the composite material in Example 1. However, each shell of the composite material in Example 6 is made of silicon oxide (inner shell) and NaOH (outer shell) instead of silicon oxide (inner shell) and NaCl and KOH (outer shell) as disclosed in Example 1.

Comparative Example 1

The composition and structure of the composite material in Comparative Example 1 is similar to the composition and structure of the composite material in Example 1. However, each shell of the composite material in Comparative Example 1 includes only KOH (without silicon oxide and other salts).

Comparative Example 2

The composition and structure of the composite material in Comparative Example 2 is similar to the composition and structure of the composite material in Example 1. However, each shell of the composite material in Comparative Example 2 includes only NaOH (without silicon oxide and other salts).

Comparative Example 3

The composition and structure of the composite material in Comparative Example 3 is similar to the composition and structure of the composite material in Example 1. However, each shell of the composite material in Comparative Example 3 is made of silicon oxide (inner shell) and NaCl (outer shell) instead of silicon oxide (inner shell) and NaCl and KOH (outer shell) as disclosed in Example 1.

Comparative Example 4

The composition and structure of the composite material in Comparative Example 4 is similar to the composition and structure of the composite material in Example 1. However, each shell of the composite material in Comparative Example 4 is made of silicon oxide (inner shell) and KCl (outer shell) instead of silicon oxide (inner shell) and NaCl and KOH (outer shell) as disclosed in Example 1.

Comparative Example 5

The composition and structure of the composite material in Comparative Example 5 is similar to the composition and structure of the composite material in Example 1. However, each shell of the composite material in Comparative Example 5 includes only silicon oxide (without alkalis and salts).

Comparative Example 6

The composition and structure of the particles in Comparative Example 6 is similar to the composition and structure of the particles in Example 1. However, each the particles in Comparative Example 6 is made of only core without any shell.

The materials of Examples 1-6 and Comparative Examples 1-6 are further analyzed by x-ray diffraction (XRD), scanning electron microscope (SEM), and hydrogen yield measurement. The results are described as follows.

X-Ray Diffraction Analysis

Figure 2:
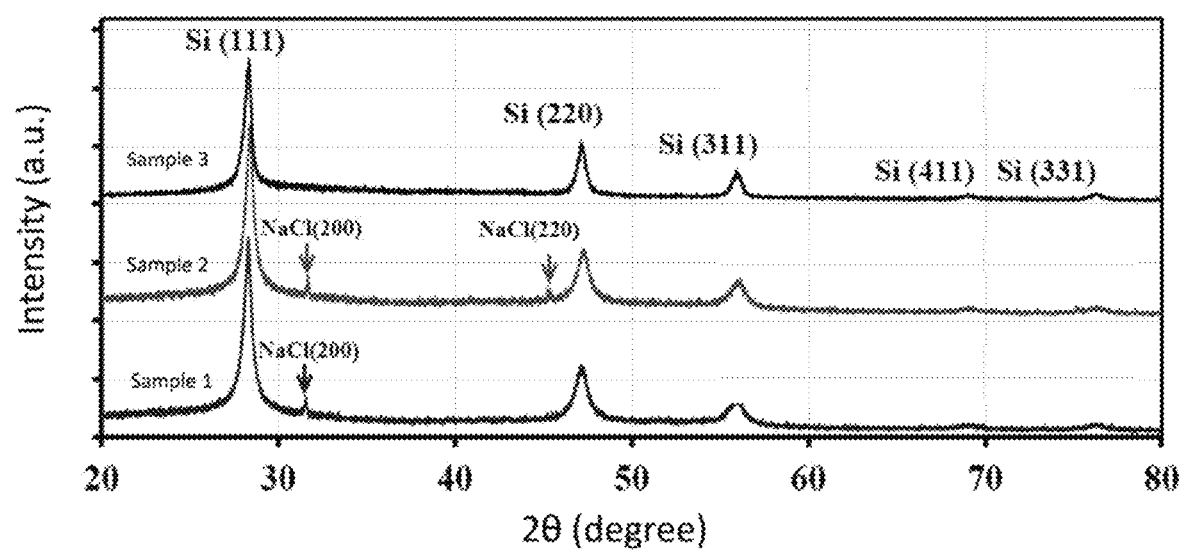
FIG. 2 is x-ray diffraction patterns for powders of various experimental examples according to some embodiments of the present disclosure.

Referring to FIG. 2, before coating the alkalis or the salts on the surfaces of the particles, X-ray diffraction analysis was performed on the Samples 3 corresponding to Comparative Example 5. As shown in FIG. 2, the crystalline silicon was observed for Comparative Example 5. Besides, after coating the alkalis and the salts on the surfaces of the particles, the silicon/silicon oxide/NaCl+KOH powder of Example 1 (i.e. Sample 1) and the silicon/silicon oxide/NaCl+NaOH powder of Example 2 (i.e. Sample 2) were also examined by X-ray diffraction. As shown in FIG. 2, a weak characteristic peak indicating the existence of crystalline NaCl was observed, which demonstrated that it was possible to obtain crystalline NaCl even though the shells of the composite were obtained by quickly drying the mixed solution.

Scanning Electron Microscope Inspection

Figure 3A:
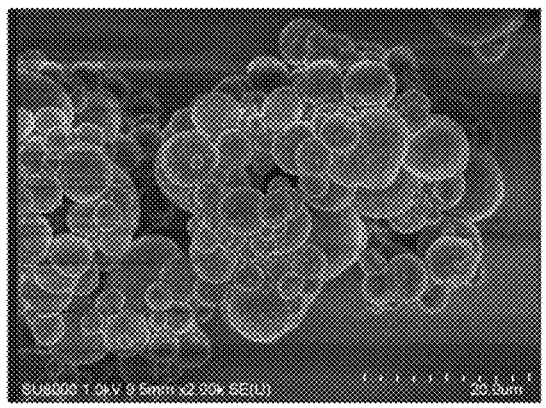
FIG. 3(a) shows an scanning electron microscope (SEM) image of powders of one experimental example according to one embodiment of the present disclosure.
Figure 3B:
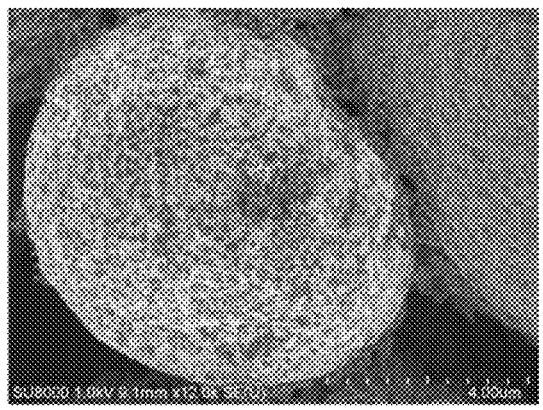
FIG. 3(b) shows an scanning electron microscope (SEM) image of powders of one experimental example according to one embodiment of the present disclosure.
Figure 3C:
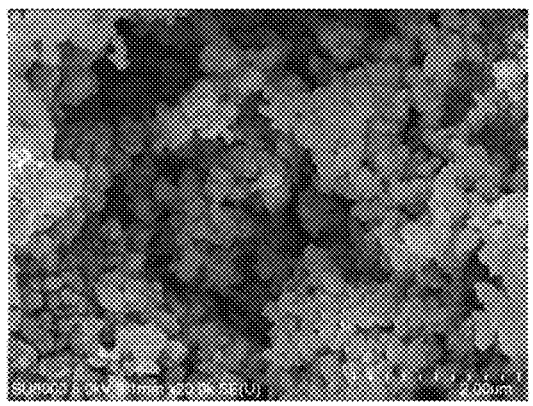
FIG. 3(c) shows an scanning electron microscope (SEM) image of powders of one experimental example according to one embodiment of the present disclosure.
Figure 3D:
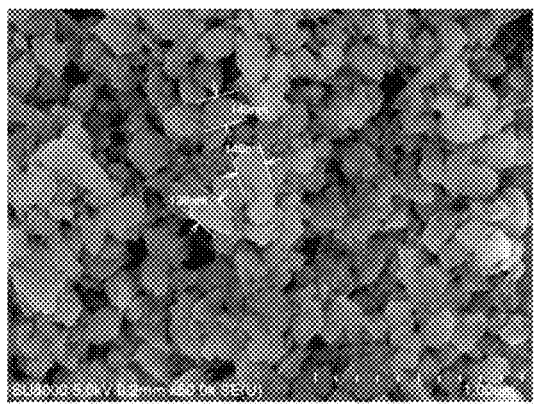
FIG. 3(d) shows an scanning electron microscope (SEM) image of powders of one experimental example according to one embodiment of the present disclosure.

Referring to FIG. 3(a) to FIG. 3(d), before coating the alkalis and the salts on the surfaces of the particles, the silicon/silicon oxide powder of Example 1 was subjected to SEM inspection, and the results were shown in FIG. 3(d). For the silicon/silicon oxide/NaCl+KOH powder, as shown in FIG. 3(a), the average diameter of the aggregated secondary particles was about 2 um to 10 um. As shown in FIG. 3(b), which was an enlarged figure showing the core-shell structures, the primary particles containing silicon/silicon oxide were coated with outer shells containing NaCl+KOH. As shown in FIG. 3(c), the topography of the silicon/silicon oxide/NaCl+KOH powder was smoother than that of the un-coated primary particles containing silicon/silicon oxide. In addition, the particle size was increased from 140 nm to 200 nm after the coating of NaCl+KOH, which demonstrated that the NaCl/KOH-containing shells increased the sizes of the particles.

Measurement of Hydrogen Produced

Figure 4:
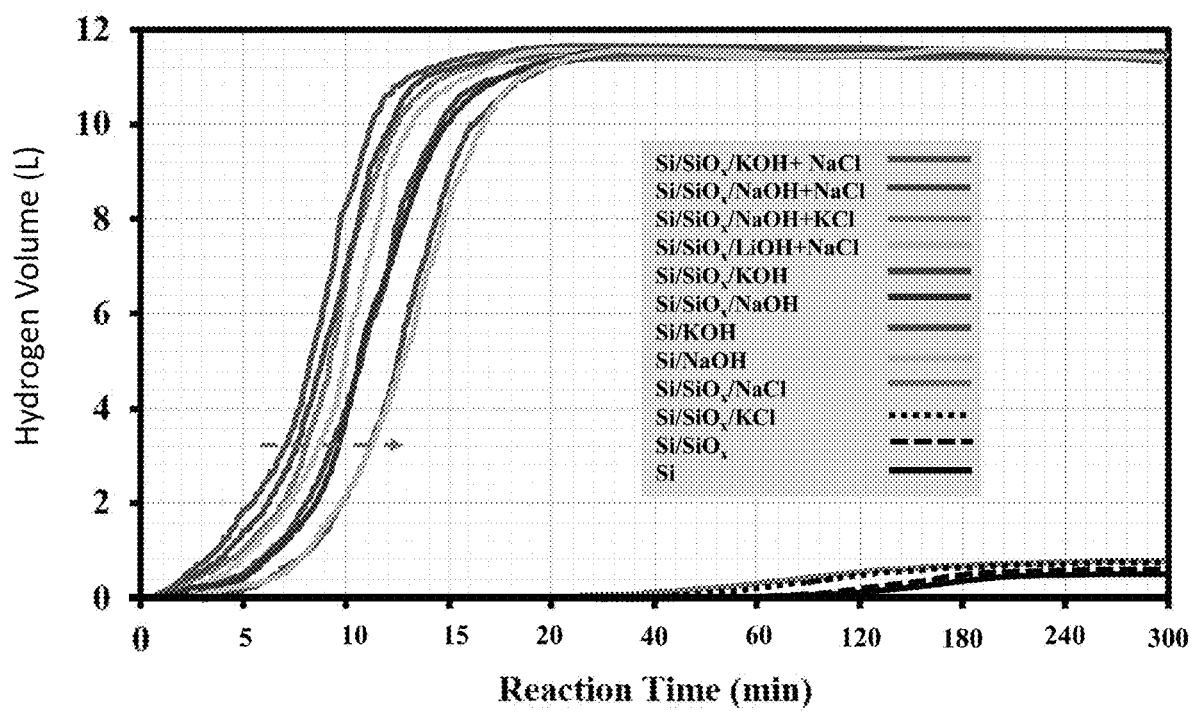
FIG. 4 shows the amount of the hydrogen gas generated from powders of various experimental examples according to some embodiments of the present disclosure.

The reaction system shown in FIG. 1 was used to collect the hydrogen gas generated from the materials of Examples 1 to 6 and Comparative Examples 1 to 6, and the total volume of the collected hydrogen gas was calculated and shown in FIG. 4. Referring to FIG. 4, curves, along the direction indicated by the arrow, may respectively correspond to the volume of the hydrogen gas generated by the materials of Examples 1 to 6 and Comparative Examples 1 to 2. For Examples 1 to 4, in which the shells contain silicon oxide, strong alkalis (KOH, NaOH or LiOH), and salts (KCl or NaCl), the time to start the reaction was less than 1 minute, and the large amount of hydrogen gas was produced quickly. Thus, the hydrogen yield was efficient. Similarly, for Examples 5 and 6, in which the shells contain silicon oxide, strong alkalis (KOH, NaOH or LiOH) but not contain salts (KCl or NaCl), the time to start the reaction was less than 5 minutes, and the large amount of hydrogen gas was also produced quickly.

In contrast, for Comparative Example 1 and Comparative Example 2, the time to start the reaction is relatively long, where the shells of the composite include strong alkali (such as KOH, NaOH or LiOH) but do not include silicon oxide and salt (such as KCl or NaCl). In addition, for Comparative Example 3 to Comparative Example 6, the time to start the reaction is longer than 30 minutes, where the shells of the composite do not contain any alkali (such as KOH, NaOH, or LiOH), or the composite even does not include any shell.

According to the above embodiments, since the composite is a powder containing fine core-shell structures, it may be easily transported from one place to another. In addition, the hydrophilic layer is disposed between the silicon-containing core and the alkali in each core-shell structure. Since it is not easy for the hydrophilic layer to chemically react with the alkali when the composite is in a powder form, the reaction between the silicon-containing core and the alkali may be prevented during the transportation of the composite. In addition, since the silicon-containing core of each core-shell structure may be covered with at least the alkali which could be dissolved in the solution quickly, the core-shell structures may be separated from each other and completely dispersed in the solution when the composite is added into a neutral or alkaline solution. Therefore, the probability that the core-shell structures aggregate in the solution would be low, thereby increasing the contact area between each silicon-containing core and the solution. In addition, since the hydrophilic layer is more hydrophilic than that of the silicon-containing core, the polar molecules generated by dissolving the alkali in the solution may wet the hydrophilic layer immediately and then further react with the hydrophilic layer and the silicon-containing core. As a result, the composite may generate hydrogen gas quickly. Therefore, by disposing the alkali on the surface of each silicon-containing core, not only may the probability of aggregation of the core-shell structures be reduced, but also the composite may generate hydrogen gas more quickly. Furthermore, the overall hydrogen generating reaction is eco-friendly since the product of the reaction is recyclable silicon oxide or silicate.

What is claimed is:

1. A composite for generating hydrogen, comprising:
    a plurality of core-shell structures, wherein each of the core-shell structures comprises:
    a silicon-containing core; and
    a shell covering the surface of the silicon-containing core, wherein the shell comprises a hydrophilic layer covering the surface of the silicon-containing core and an alkali covers the hydrophilic layer.

2. The composite for generating hydrogen, as recited in claim 1, wherein the core-shell structures are in powder form.

3. The composite for generating hydrogen, as recited in claim 1, wherein each of the silicon-containing cores is crystalline silicon.

4. The composite for generating hydrogen, as recited in claim 1, wherein each of the shells is a double-layered structure.

5. The composite for generating hydrogen, as recited in claim 1, wherein each of the shells is a multi-layered structure.

6. The composite for generating hydrogen, as recited in claim 1, wherein a composition of each of the hydrophilic layers comprises silicon oxide.

7. The composite for generating hydrogen, as recited in claim 1, wherein each of the hydrophilic layers has a thickness of 4 nm to 30 nm.

8. The composite for generating hydrogen, as recited in claim 1, wherein the alkali of each of the shells directly contacts the hydrophilic layer.

9. The composite for generating hydrogen, as recited in claim 1, wherein the alkali is a strong alkali.

10. The composite for generating hydrogen, as recited in claim 9, wherein the strong alkali is selected from the group consisting of sodium hydroxide, potassium hydroxide, and lithium hydroxide.

11. The composite for generating hydrogen, as recited in claim 1, wherein each of the shells further comprises a salt covering the hydrophilic layer.

12. The composite for generating hydrogen, as recited in claim 11, wherein the alkali directly contacts the salt.

13. The composite for generating hydrogen, as recited in claim 11, wherein the salt comprises a salt having solubility greater than 9.6 g/100 ml in water at 20° C.

14. The composite for generating hydrogen, as recited in claim 11, wherein a cation of the salt is selected from the group consisting of lithium ion, sodium ion, and potassium ion, and an anion of the salt is selected from the group consisting of chloride ion, carbonate ion, and sulfate ion.

15. The composite for generating hydrogen, as recited in claim 11, wherein the alkali and the salt of each shell are homogeneously mixed with each other.

16. The composite for generating hydrogen, as recited in claim 11, wherein one of the alkali and the salt covers the other one of the alkali and the salt.

* * * * *